United States Patent

[11] 3,632,042

[72] Inventors  Joseph N. Goulish
               Fenton;
               Robert E. Owen, Grand Blanc, both of Mich.
[21] Appl. No.  867,515
[22] Filed      Oct. 20, 1969
[45] Patented   Jan. 4, 1972
[73] Assignee   General Motors Corporation
                Detroit, Mich.

[54] HEATED WINDSHIELD WASHER SYSTEM
     4 Claims, 3 Drawing Figs.
[52] U.S. Cl. .................................................... 239/130,
                                              239/139, 239/284
[51] Int. Cl. .................................................... B05b 1/10,
                                                       B05b 1/24
[50] Field of Search ........................................... 239/128,
                                                    130, 139, 284

[56]              References Cited
               UNITED STATES PATENTS
1,642,418   9/1927   Kovanda et al. .............. 239/139 X
2,234,555   3/1941   Erickson ...................... 239/139
3,219,274  11/1965   Roche .......................... 239/139 X
3,243,119   3/1966   Merkle ......................... 239/284 X
3,366,336   1/1968   Neuschwanger et al. ...... 239/129

*Primary Examiner*—M. Henson Wood, Jr.
*Assistant Examiner*—Michael Y. Mar
*Attorneys*—W. E. Finken and W. A. Schuetz ABSTRACT: In a preferred form, this disclosure relates to a windshield washer system for washing the windshield of an automotive vehicle. The windshield washer system includes a nozzle means for directing washer fluid against the windshield, a reservoir for containing the washer fluid, a pump assembly having an inlet and an outlet, first and second conduit means for communicating the reservoir with the inlet of the pump assembly and the outlet of the pump with the nozzle means, and a heater means in the form of a conduit means through which heated engine coolant fluid is circulated. The latter conduit means is in heat exchange relationship with the reservoir, the first and second conduit means and the nozzle means whereby the washer fluid is heated while in the reservoir and throughout its path of movement from the reservoir to the nozzle means.

PATENTED JAN 4 1972  3,632,042

INVENTORS
Joseph N. Goulish &
BY Robert E. Owen
W.A. Schuetz
ATTORNEY

HEATED WINDSHIELD WASHER SYSTEM

The present invention relates to a windshield washer system for an automotive vehicle, and more particularly to a windshield washer system which includes a nozzle means for directing washer fluid against the windshield, a reservoir for containing a supply of washer fluid, a pump assembly for supplying washer fluid under pressure from the reservoir to the nozzle means and a means for heating the washer fluid.

An important object of the present invention is to provide a new and improved windshield washer system of the character described above and in which the washer fluid is heated while in the reservoir and throughout its path of movement from the reservoir to the nozzle means.

Another object of the present invention is to provide a new and improved windshield washer system and in which heated coolant fluid from the engine is passed in heat exchange relationship with the reservoir for containing the washer fluid and in heat exchange relationship with the fluid throughout its path of movement from the reservoir to the nozzle means.

Yet another object of the present invention is to provide a new and improved windshield washer system as defined in the preceding objects and which includes a conduit means operatively connected with the engine coolant system for circulating heated coolant fluid therethrough and in which the conduit means includes a portion, preferably a W-shaped portion, disposed within the reservoir and another portion concentrically disposed within conduits for supplying the washer fluid to the nozzle means and which passed through the nozzle means so that the washer fluid is heated while in the reservoir and heated throughout its path of movement from the reservoir to the nozzle means.

The advantages of the novel heated windshield-washing system of the present invention are that it prevents icing of the nozzle means and other parts of the washer system during running operation of the vehicle, even in very cold temperatures and assures that washer solvent will be squirted against the windshield when the pump assembly is energized. It also deices the nozzles and/or other parts of the system after the engine has been run for a short time period. Additionally, it allows washer solvents having higher freezing temperatures to be used.

The present invention further resides in various novel constructions and arrangement of parts, and further objects, novel characteristics and advantages of the present invention will be apparent to those skilled in the art to which it relates and from the following detailed description of the preferred embodiment thereof made with reference to the accompanying drawings forming a part of this specification and in which similar reference numerals or characters are employed to designate corresponding parts throughout the several views, and in which.

Figure 1:
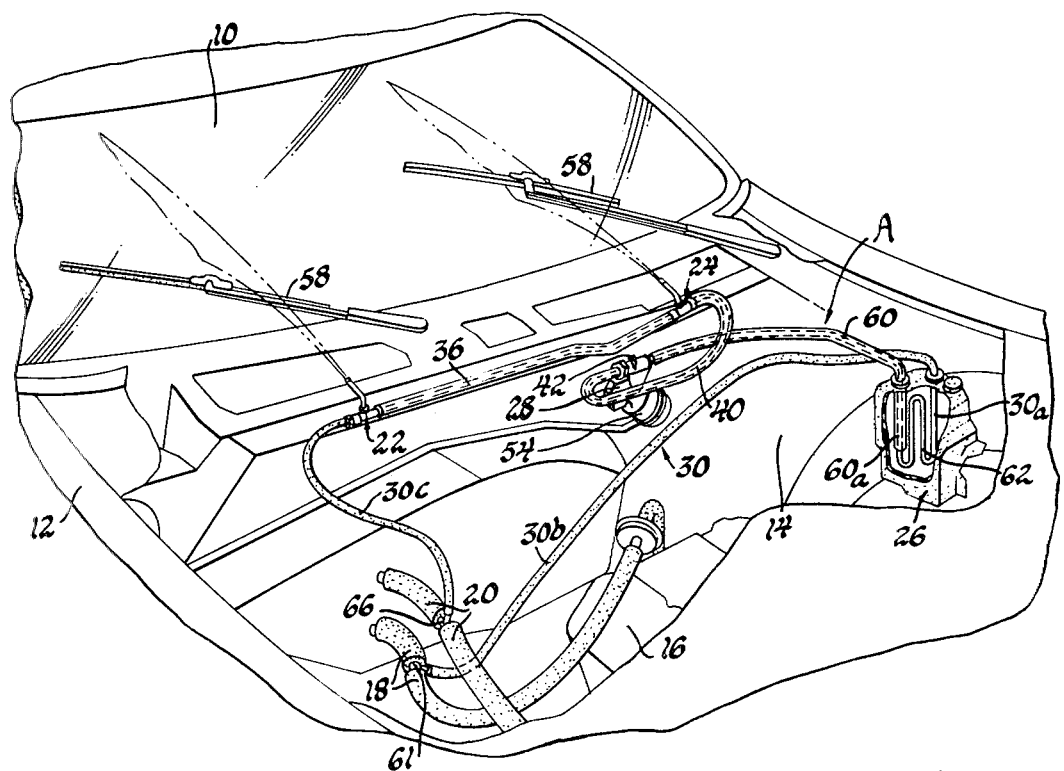
FIG. 1 is a fragmentary perspective view of an automotive vehicle embodying the novel windshield-washing system of the present invention.

As representing a preferred embodiment of the present invention, the drawings show a windshield washer system A for washing a windshield 10 of an automotive vehicle 12. The vehicle 12 includes an engine compartment 14 for housing an internal combustion engine 16 and an engine coolant system for circulating a coolant fluid through the engine 16 for cooling the same. The coolant system includes a conduit means 18 for directing a portion of the heated coolant fluid from the engine 16 to a heater (not shown) for the vehicle 12 and a return conduit means 20 for directing the heated fluid from the heater back to the engine 16.

The windshield washer system A comprises, in general, a pair of spaced nozzle means 22 and 24 carried by the vehicle 12 adjacent the lower edge of the windshield 10; a reservoir or container 26 containing a suitable washer fluid or solvent and which is carried by the vehicle 12 and located in the engine compartment 14; a pump means 28 suitably carried by the vehicle 12 for pumping fluid from the reservoir 26 to the nozzle means 22 and 24; and a heater means, designated generally be reference numeral 30, for heating the washer fluid while in the reservoir 26 and throughout its path of movement from the reservoir 26 to the nozzle means 22 and 24. The heater means 30 comprises a conduit means which is in heat exchange relationship with the washer fluid in the reservoir 26 and throughout its path of movement from the reservoir 26 to the nozzle means 22 and 24.

The nozzle means 22 and 24, in the illustrated embodiment, comprise T-shaped connector assemblies having through openings 31 and 32 therethrough through which a metal tubular portion 30a of the conduit or heater means 30 extends. The nozzle means 22 has an annular inlet 34 which is in communication with an annular outlet 35 of the nozzle means 24 via a conduit 36. The inlet 34, outlet 35 and conduit 36 are disposed concentrically with respect to the conduit portion 30a to define a concentric flow passage 37 around the conduit portion 30a. The nozzle means 24 also has an annular inlet 38 which is connected to one end of a conduit 40, the other end of the conduit 40 being connected with an outlet 41 of an adapter means or assembly 42. The adapter assembly 42 is generally Y-shaped and has an inlet 43 and a through opening 44 therethrough through which the conduit portion 30a extends. The Y-shaped adapter assembly also has transversely extending passage 45 in communication with the inlet 43 and the transversely extending outlet passage 46 in communication with the outlet 41. The inlet 43 and outlet 41 concentrically surround and are of a larger diameter than the conduit portion 30a. Communication between the inlet 41 and outlet 43 and between the passages 45 and 46 is prevented by an annular, resilient sealing member 47. The sealing member 47 forms a fluid dam and is clampingly held in tight-sealing engagement with the conduit portion 30a and against an annular seat 48 in the adapter assembly 42 by an adjustably positionable member 49 of the adapter assembly 42. The member 49 defines the outlet 41 and is threadably engaged, as indicated by reference numeral 50, with the main body member 51 of the adapter assembly 42. The member 49 at its inner end engages the sealing member 47 and has a plurality of openings 52 in its sidewall which are in communication with the passage 46.

The passages 45 and 46 are adapted to be in communication with the inlet and outlet of a pump assembly 28 which is suitably connected to the adapter means 42 and carried by the vehicle 12. The pump assembly 28 could be of any suitable or conventional construction, but is preferably a programmed pump assembly having a reciprocable-type pump driven by an electric motor 54. The motor 54 is also operatively connected with a pair of windshield wipers 58 for oscillating the same to and fro across the outer surface of the windshield 10, and in any suitable or conventional manner. The pump assembly 28 is preferably of the construction shown in copending application Ser. No. 701,443, filed Jan. 29, 1968 in the name of Robert F. Romanowski, and assigned to the same assignee as the present invention. The inlet 43 of the adapter assembly 42 is in communication with the reservoir 26 via a conduit 60, the conduit 60 including a portion 60a which extends within the reservoir to a location closely adjacent the bottom thereof.

In operation, when the pump assembly 28 is energized, washer fluid or solvent is drawn from the reservoir 26 via conduit 60, inlet 43 of the adapter assembly 42, passage 45, into the pump assembly 28. Washer solvent under pressure is delivered by the pump assembly 28 via outlet passage 46, openings 52, outlet 41 of the Y-shaped adapter assembly, conduit 40, nozzle means 24, and via conduit 36 to nozzle means 22.

Figure 2:
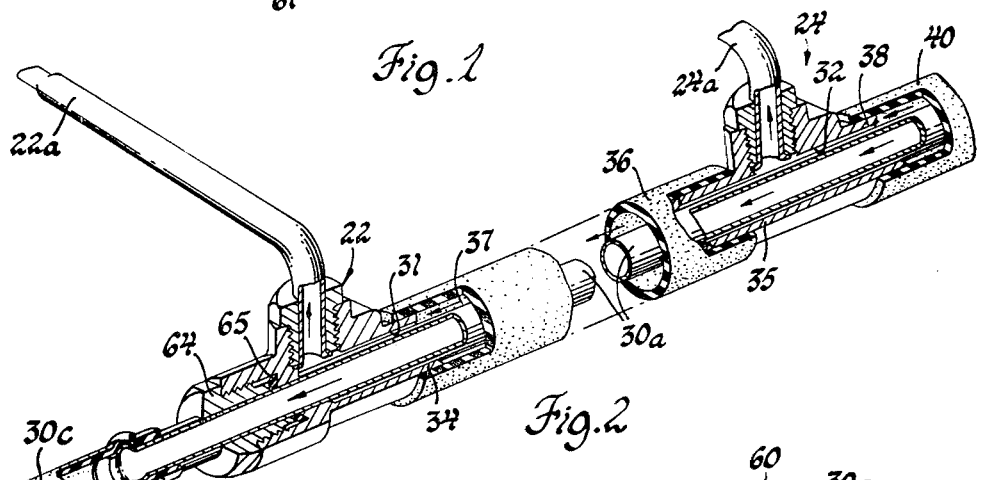
FIG. 2 is an enlarged fragmentary perspective view of part of the windshield-washing system shown in FIG. 1 and with portions thereof shown in section.
Figure 3:
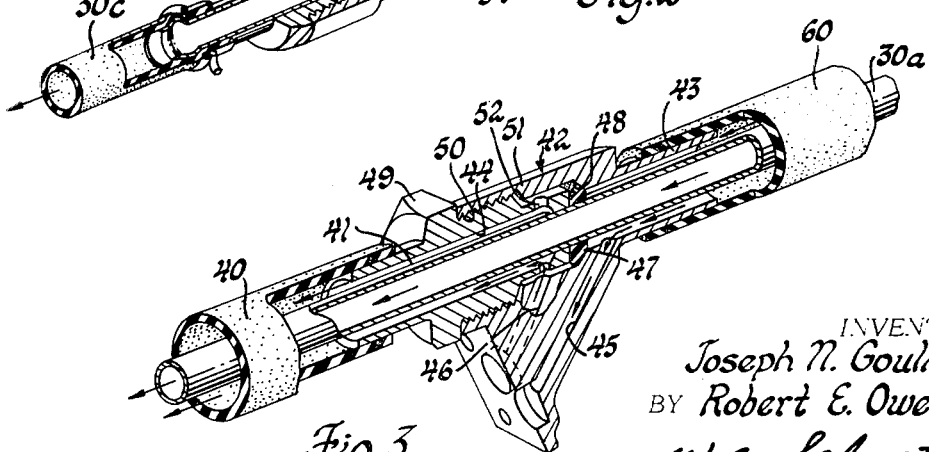
FIG. 3 is an enlarged fragmentary perspective view of part of the windshield-washing system shown in FIG. 1, and with portions thereof shown in section.

Washer fluid or solvent is emitted from the nozzle means 22 and 24 in the form of a jet spray against the outer surface of the windshield and in the path of movement traversed by the oscillating windshield wipers 58. As best shown in FIGS. 1 and 2 the nozzle means 22 and 24 also include tubular portions 22a and 24a which have their outer ends pinched so as to emit the washer fluid in the form of a jet spray.

In accordance with the provisions of the present invention, the washer solvent is heated while in the reservoir 26 and throughout its path of movement from the reservoir 26 to the nozzle means 22 and 24. This is accomplished by the conduit or heater means 30. The conduit means 30 includes a flexible hose portion 30b having one end connected to a T-shaped fitting or connector 61 in the heater hose means 18 and its other end connected to one end of the conduit portion 30a. The conduit portion 30a includes a generally W-shaped section 62 disposed within the reservoir 26 and the conduit portion 30a extends throughout the length of the conduit 60. The tubular portion 30a is concentrically disposed within the conduit 60 to define a flow passage between the conduit 60 and the portion 30a and extends through the adapter 42 and is concentrically disposed within the conduit 40. The conduit portion 30a also extends through the nozzles 24 and 22. The nozzle 22 has an annular plug 64 for clamping an annular rubber seal 65 into engagement with the outer side of the conduit portion 30a to prevent leakage of washer solvent past the left end of the nozzle means 22, as viewed in FIG. 1. The outlet of the conduit portion 30a is connected via flexible conduit portion 30c to a T-shaped fitting or connector 66 in the return heater hose means 20.

From the foregoing, it should be apparent that when the engine is running, a portion of the heated engine coolant fluid constantly flows from the heater hose means 18 through the conduit portion 30b, the W-shaped section 62 of the conduit portion 30a disposed in the reservoir 26 and thence through the conduit portion 30a and conduit portion 30c to the return heater hose means 20. This results in the washer solvent or fluid being heated via conduction while in the reservoir 26 as well as being heated throughout its path of movement from the reservoir 26 to the pump assembly 28 and from the pump assembly to the tubular outlet portions 22a and 24a of the nozzle means 22 and 24. This also results in the adapter assembly 42 and nozzle means 22 and 24 being conductively heated by the engine coolant fluid.

It should be understood that the various conduits could be made from any suitable material, but preferably the inner conduit portion 30a concentrically disposed within the conduits 36, 40 and 60 for the washer fluid is preferably made from a metal while the remaining conduits and conduit portions are preferably made from a resilient or rubberlike material. Also it should be understood that suitable valve means could be provided in the system for selectively controlling circulation of heated engine coolant fluid through the conduit means 30.

The windshield washer system of the present invention prevents icing of the nozzle means and other parts of the washer system during running operation of the engine and assures that washer solvent will be squirted against the windshield when the pump assembly 28 is operated. Moreover, even if an iced condition exists prior to starting the engine 16, the washer system will be heated within a relatively short period of time after starting the engine to deice the same and to allow normal operation of the washer system. Additionally, it allows washer solvents having a higher freezing temperature to be used.

Although the illustrated embodiment hereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A windshield washer system for washing a windshield of an automotive vehicle comprising: nozzle means adapted to be located adjacent the windshield for directing washer fluid against the windshield; a reservoir for containing washer fluid; a pump assembly having an inlet and an outlet; first conduit means for communicating said reservoir with said inlet of said pump assembly; second conduit means for communicating said outlet of said pump assembly with said nozzle means; third conduit means which is adapted to be connected with the engine coolant system of the vehicle and through which a portion of the engine coolant fluid is adapted to be circulated, said third conduit means having a portion of its length disposed within said reservoir, being substantially concentrically disposed within and extending throughout the full length of said first and second conduit means and extending through said nozzle means whereby said washer fluid is heated while in said reservoir and throughout its path of movement from said reservoir to said nozzle means.

2. In an automotive vehicle having a windshield, an engine, an engine coolant system for cooling the engine and a windshield washer system for washing the windshield of the vehicle, said windshield washer system comprising: nozzle means located adjacent the windshield for directing washer fluid against the windshield; a reservoir for containing washer fluid; pump means including an adapter means having a straight through opening and having an inlet and an outlet; first conduit means for communicating said reservoir with said inlet of said adapter means; second conduit means for communicating the outlet of the adapter means with said nozzle means; third conduit means operatively connected with the engine coolant system of the vehicle for circulating heated engine coolant therethrough; said third conduit means having a portion of its length disposed within said first and second conduit means and extending through said through opening in said adapter means and said nozzle means whereby said washer fluid is heated while in said reservoir and throughout its path of movement from said reservoir to said nozzle means; said third conduit means being of a smaller diameter than said first and second conduit means whereby said washer fluid circulates between said conduit means while said heated coolant fluid flows through said third conduit means; and an annular resilient sealing member disposed within said through opening in said adapter means and resiliently engaging said third conduit means to block communication between said inlet and outlet of said adapter means except through said pump means.

3. In an automotive vehicle as defined in claim 2, wherein said portion of said third conduit means disposed within said reservoir is W-shaped.

4. In an automotive vehicle as defined in claim 2, wherein said nozzle means comprises a T-shaped connector means having a through opening therethrough through which the third conduit extends and a nozzle portion for delivering the washer fluid in jet form against the windshield.

* * * * *

PO-1050
(5/69)

UNITED STATES PATENT OFFICE
CERTIFICATE OF CORRECTION

Patent No. 3,632,042     Dated January 4, 1972

Inventor(s) Joseph N. Goulish and Robert E. Owen

It is certified that error appears in the above-identified patent and that said Letters Patent are hereby corrected as shown below:

Column 1, line 28 "passed" should read --passes--; line 38 "deices" should read --de-ices--. Column 2, line 40 before "member" insert --annular--. Column 3, line 58 "deice" should read --de-ice--. Column 4, line 40 after "within" insert --said reservoir and being concentrically disposed within--.

Signed and sealed this 30th day of May 1972.

(SEAL)
Attest:

EDWARD M. FLETCHER, JR.
Attesting Officer

ROBERT GOTTSCHALK
Commissioner of Patents